United States Patent
Schmitt et al.

(10) Patent No.: US 6,744,371 B1
(45) Date of Patent: Jun. 1, 2004

(54) SENSING DEVICE FOR DETECTING WETNESS ON A GLASS PANE

(75) Inventors: Patrick Schmitt, Lichtenau (DE); Norbert Hog, Buehl (DE); Andreas Gille, Buehl (DE); Bruno Hodapp, Achern-Oensbach (DE); Gebhard Michenfelder, Lichtenau (DE); Rainer Pientka, Renchen (DE); Hans Meier, Ottersweier (DE); Henry Blitzke, Buehl (DE); Manfred Burkart, Iffezheim (DE)

(73) Assignee: Robert Bosch GmbH, Stuttgart (DE)

( * ) Notice: Subject to any disclaimer, the term of this patent is extended or adjusted under 35 U.S.C. 154(b) by 1 day.

(21) Appl. No.: 10/030,836

(22) PCT Filed: Jul. 5, 2000

(86) PCT No.: PCT/DE00/02199

§ 371 (c)(1),
(2), (4) Date: Apr. 17, 2002

(87) PCT Pub. No.: WO01/05637

PCT Pub. Date: Jan. 25, 2001

(30) Foreign Application Priority Data

Jul. 17, 1999 (DE) .......................... 199 33 641

(51) Int. Cl.$^7$ .............................................. G08B 21/00
(52) U.S. Cl. .................. 340/602; 250/574; 250/227.25; 318/483
(58) Field of Search ................................. 340/602, 604, 340/603; 250/574, 216, 227.25, 239, 341.8, 575, 573; 318/483, DIG. 2

(56) References Cited

U.S. PATENT DOCUMENTS

| 5,661,303 | A | | 8/1997 | Teder | |
| 5,898,183 | A | | 4/1999 | Teder | |
| 6,023,335 | A | * | 2/2000 | Wustefeld | .................... 356/388 |
| 6,232,603 | B1 | * | 5/2001 | Nelson | .................... 250/339.1 |
| 6,307,198 | B1 | * | 10/2001 | Asakura et al. | ........ 250/227.25 |

FOREIGN PATENT DOCUMENTS

| DE | 197 01 258 A1 | 7/1997 |
| DE | 198 15 748 A | 10/1999 |

* cited by examiner

*Primary Examiner*—Anh V. La
(74) *Attorney, Agent, or Firm*—Michael J. Striker

(57) ABSTRACT

A sensor arrangement for detecting a wetting, in particular a precipitation and dirt accumulation, on a window (13) is proposed, with at least one transmitter (14) and at least one receiver (15) for the transmitter light (17) emitted by the transmitters (14), where the transmitters (14) and receivers (15) are disposed on the vertex points of an imaginary trapezoid. As a result, the external dimensions of the sensor are reduced, the ratio of sensitive area (19) and base area (18) of the sensor is improved, and a coherent sensitive area is produced, where there is also space available for a receiving element of an automatic light control.

14 Claims, 3 Drawing Sheets

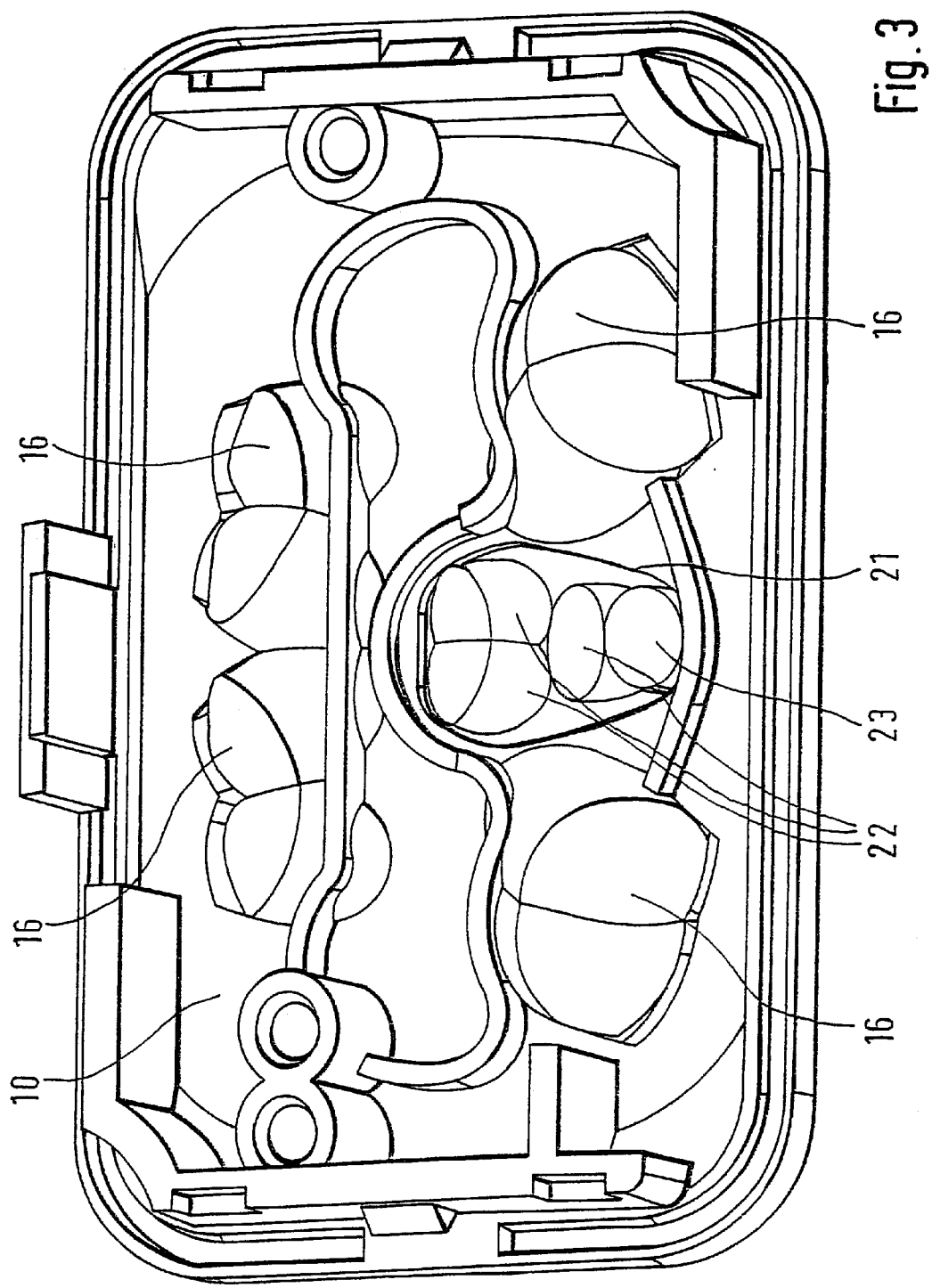

SENSING DEVICE FOR DETECTING WETNESS ON A GLASS PANE

PRIOR ART

The invention is based on a sensor arrangement for detecting a wetting of a window, according to the preamble to the main claim.

DE 197 01 258 A1 has disclosed a sensor arrangement for controlling wiper/washer systems for motor vehicle windows, which function in accordance with an optoelectronic principle. The sensor arrangement has a number of transmitters and at least one receiver which, through the use of a coupling means, couple a defined radiation into and out of the window, whose wetting by moisture or dirt accumulation is to be measured. The transmitters are arranged on the coupling means, concentrically around the receiver or in concentric segments, where the coupling means are embodied in the form of a circle or ring. The transmitters, receivers, and coupling means are consequently mounted on a circular base area. As a result, the sensor or the sensor housing is embodied in the form of a circular cylinder.

ADVANTAGES OF THE INVENTION

One advantage of the sensor arrangement according to the invention, with the features of the main claim, is a significant improvement in the response characteristics of the sensor arrangement, which arises due to the increase in the ratio of the sensitive area to the supporting area. This is achieved by means of the trapezoidal arrangement the transmitters and receivers, since this produces an oblong, coherent sensitive area which increases the probability that a raindrop disposed on the window will drift onto the sensitive area, impelled by the relative wind. This results in a considerable improvement in the response characteristics.

Other advantages of the invention ensue from the characterizing features of the dependent claims.

Through the use of a number of receivers per transmitter, the number of measurement paths and therefore the number of sensitive areas is increased, which achieves a cost advantage. The same effect occurs when several transmitters and only one receiver are used. If two transmitters and two receivers are used, then four measurement paths and therefore four sensitive areas can be produced. If the distance of the two transmitters is approximately twice the distance of the two receivers, this results in a particularly uniform arrangement of the sensitive areas.

It also turns out to be advantageous to fasten the sensor arrangement to the window in such a way that in the installed position, the transmitters are disposed on the lower parallel of the trapezoid and the receivers are disposed on its upper parallel. Solar radiation onto the receivers, which preferably comes from above and represents an interfering external light, can thus be minimized.

As a result of the improved properties, in particular due to the improved ratio between the sensitive area and the supporting area, the supporting area of the sensor can be reduced, as a result of which the external dimensions of the sensor on the window are reduced. In this connection, it is particularly advantageous that due to the trapezoidal arrangement of the transmitters and receivers, the outer dimensions of the sensor housing can nevertheless be chosen as rectangular so that by making optimal use of the supporting area of the optical body, the base surface can be disposed within this supporting area. A rectangular supporting area and housing also have a cost-reducing effect on production. In addition, the smaller supporting area of the optical body represents a significant installation advantage since with a constant contact force, the contact pressure increases and consequently, an interfering formation of bubbles between the coupling medium and the window can be avoided.

It also turns out to be advantageous that the two transmitters and the two receivers are respectively disposed on the opposite, parallel sides in the arrangement. Since this produces four measurement paths, i.e. four sensitive areas of the sensor with only two transmitters and two receivers, this achieves a significant cost advantage.

An advantageous modification of the sensor arrangement has turned out to be one in which an automatic light control (ALC), for example of the kind described in DE 196 30 216 C2, is integrated into the rain sensor module. The receiving optics of the automatic light control (ALC) can detect a wide surrounding field by means of a directional and global sensing mechanism. Thus, for example, the forward-facing detection cones of the directional sensing mechanism can promptly detect tunnel entrances before the vehicle actually enters them. The trapezoidal arrangement of the transmitters and receivers, leaves sufficient space in the center of the sensor for the receiving optics, despite the compact design. In this connection, it turns out to be advantageous that the trapezoid has a larger parallel and a smaller parallel since the receiving optics can thus extend in the direction of the greater parallel without increasing the overall dimensions of the sensor.

DRAWINGS

An exemplary embodiment of the invention is shown in FIGS. 1 to 3 and will be explained in detail in the subsequent description.

FIG. 3 is a perspective view of the optical body of the sensor arrangement according to the invention from FIG. 1, with a set of receiving optics for an automatic light-control.

DESCRIPTION OF THE EXEMPLARY EMBODIMENT

Figure 1:
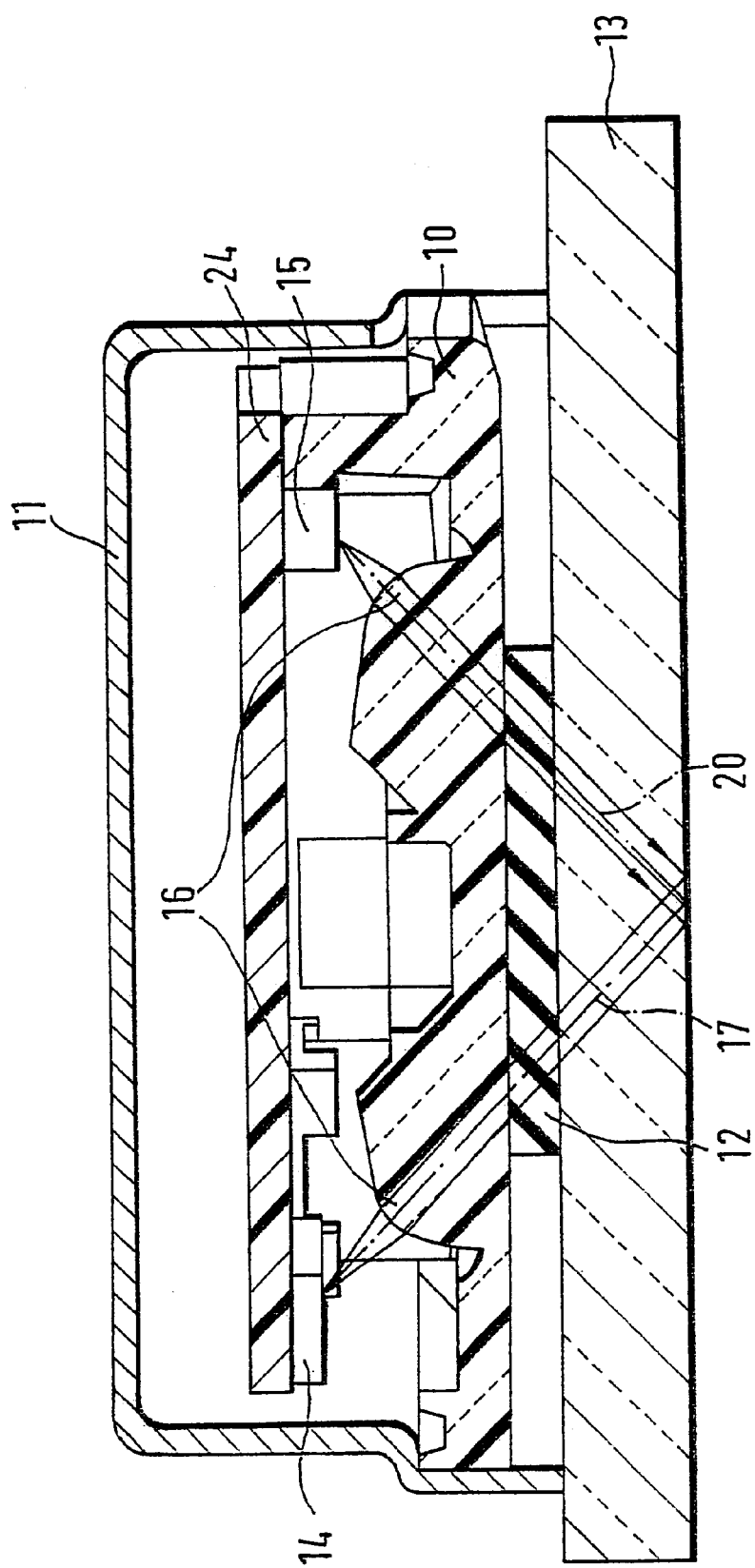
FIG. 1 is a schematic sectional depiction of a possible embodiment of the optical part of the sensor arrangement according to the invention.

FIG. 1 shows an optical body 10 of a sectionally depicted sensor arrangement with a sensor housing 11. The supporting area of the optical body 10 is defined, for example, by its contact with a window 13 by means of the coupling medium 12, e.g. a silicon cushion. Generally, the outer dimensions of the optical body 10 approximately correspond to the length and width measurements of the sensor arrangement; in this connection, the sensor housing 11 can also protrude in a bulging fashion over the contacted supporting area of the optical body 10 on the window 13 and within this supporting area, can contain different elements of the sensor arrangement, particularly the transmitters 14 and receivers 15, as well as a printed circuit board 24.

The sensor arrangement is fastened, for example, to the inside of the window 13, for example a front window of a motor vehicle. The attachment of the sensor housing 11 to the window 13 is not shown. Preferably, the optical body 10 or the sensor housing 11 is attached to the window 13 by being pressed against it, where the optical body 10 performs the function of coupling a transmitter light 17 emitted by a transmitter 14 into the window 13 and coupling the transmitter light 20 deflected in the window 13 by means of reflection or total reflection out of the window at a different predetermined location and conveying it to a receiver 15. This occurs here in optical elements 16, which are attached to the optical body as lenses, preferably formed onto it, and which bundle, deflect, or divert the transmitter light 17, 20 into the desired direction.

Above the optical body 10 in the intersecting plane shown, at least one light-emitting transmitter 14 and one light-detecting receiver 15 are connected inside the sensor housing 11. Preferably light-emitting diodes (LEDs) are to be used as transmitters and light-detecting diodes (LRDs) are to be used as receivers, where the transmitter emission of the light lies in the infrared (IR) range or in the visible range (VIS), but it is also possible to use any other frequency range. A receiver element that corresponds in its design to a light-emitting diode can also be used as a receiver, as a result of which an optimal frequency adaptation between the transmitter 14 and receiver 15 can be achieved. As a material for the optical body 10, a material is chosen, a plastic in this case, which is transparent for the transmitting frequency of the light-emitting diodes (LEDs), but is in fact opaque for interfering external light.

Figure 2:
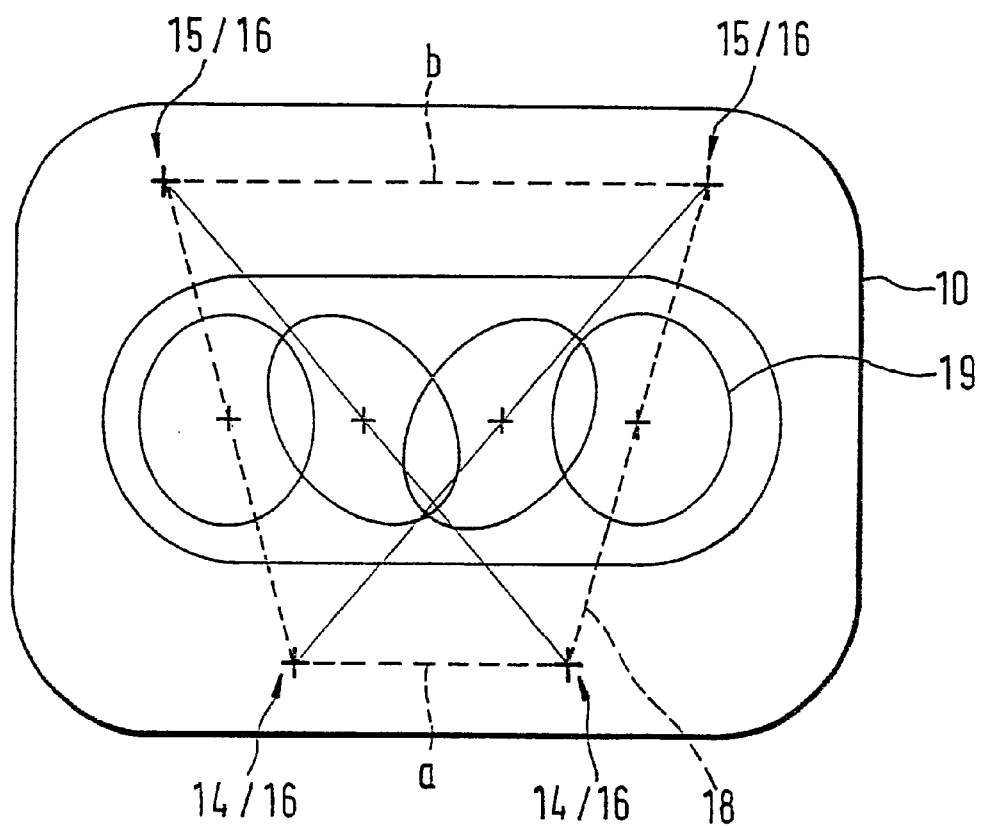
FIG. 2 is a schematic depiction of the contours of a possible embodiment of the sensor arrangement according to the invention.

FIG. 2 shows a possible arrangement of the transmitters 14 and receivers 15. The transmitters 14 and receivers 15 of the sensor arrangement are placed close to the optical elements 16 from FIG. 1. The transmitters 14, receivers 15, and the respective optical elements 16 associated with them span a base area 18 that corresponds to a trapezoid according to the invention.

Two optical elements 16 are disposed on a first parallel of the trapezoid, each close to a transmitter 14. Because the optical elements 16 in this case are embodied as two lenses disposed next to each other, two measurement paths in two directions are produced for each transmitter 14. The receivers 15 are disposed analogously. The optical elements 16 are comprised, for example, of lenses or mirrors, which can also transition into one another. An embodiment with only one lens is also possible since through an appropriate choice of the distances a and b of the trapezoidal base area 18, the angular error produced can be selected to be as slight as possible.

The distances a and b between the transmitters 14 and the receivers 15 are determined by the wavelength of the radiation being emitted by the transmitters 14, the thickness of the window 13 and of the optical body 10, the refraction index of the window 13, and the entry angle and entry point of the transmitter light 17 into the window. The distances are chosen so that the radiation of the transmitter light 17 coupled into the window 13 is totally reflected a single time per measurement path, against the outer surface of the window 13 and is then coupled out of the window 13 and conveyed to the receiver 15.

The sketched-in sensitive area 19 corresponds to the regions on the wettable side of the window 13 against which the total reflection of the radiation of the transmitter light 17 occurs when the window 13 is not wet. The reflection surfaces of the transmitter light 17 have a particular diameter depending on the arrangement of the transmitters 14 and receivers 15 in relation to the window 13, the thickness of the window 13, and the form of the optical elements 16. According to the invention, though, the above-mentioned parameters should be of sufficient magnitude that an approximately coherent sensitive area 19 is produced from the reflection surfaces. This is achieved according to the invention by virtue of the fact that the points at which the central axes of the radiation cones 20 of the transmitters 14 intersect with the wettable side of the window 13 are disposed on a straight line and are spaced approximately the same distance apart from one another.

When there is more than one desired total reflection against the wettable outside of the window 13, the distance a and b of the transmitters 14 and receivers 15 or of the respectively associated optical elements 16 must be selected as correspondingly greater and the coupling medium 12 need only be affixed to the coupling-in and coupling-out regions of the light on the window 13.

FIG. 3 shows the optical body 10 of the sensor arrangement according to the invention from FIG. 1. Since the trapezoid of transmitters 14 and receivers 15 has a shorter parallel and a longer parallel, a set of receiving optics 21 for an automatic light control of the motor vehicle is disposed shifted off-center toward the longer parallel. This set of receiving optics 21 is made of a transparent material whose transparency range lies in the visual range.

The optical body 10 and the set of receiving optics 21 are produced of one piece, for example in a multi-component injection molding process; however, an embodiment comprised of a number of individual parts is also possible, where in this instance, the set of receiving optics 21 is inserted into a corresponding recess of the optical body 10.

In this instance, the set of receiving optics 21 itself is comprised of four approximately lens-shaped elements 22, 23. One or more daylight sensors, not shown here, are affixed in a sensor housing in the vicinity of these elements, with which the light conditions in the vicinity of the vehicle can be detected in a directionally sensitive manner. The one first element 23 of these lens-shaped elements 22, 23 is embodied in such a way that it detects the overall brightness in the vicinity of the vehicle without directional sensitivity. The remaining three lens-shaped elements 22 point with narrow light detection cones in three different directions in front of the motor vehicle in order to be able to promptly detect tunnel entrances, for example, particularly at a time when these entrances are not disposed exactly in the direction of travel.

Often Plexiglas (PMMA) is used as a material for the optical body 10 since it is inexpensive and easy to process. However, since transparency is only required in the vicinity of the transmitter light, a different plastic is also conceivable. It is also particularly suitable to use a optical body material which, for example due to a chemical or physical process, has softer and more elastic properties on the side oriented toward the window 13 than on the side oriented away from the window 13 since this permits the elimination of the coupling medium 12.

In order to achieve the filter properties of the optical body 10, certain materials, in particular carbon black particles, can be added in a spatially selective manner to the material during the manufacturing process of the optical body 10. Thus, for example, it is possible for only the regions, which are functionally required for the transmitter light 17, to be transparent. An analogous process is also possible for the coupling medium 12.

In other variants, a transmitter 14 and a receiver 15 are placed at each vertex point of the trapezoid or only one transmitter 14 is used for the entire trapezoid, where in this instance, the optical elements 16 have reflective properties in order to nevertheless be able to couple transmitter light 17 into the window 13 at several vertex points of the trapezoid.

The set of receiving optics 21 can include a multitude of elements 22, 23, in particular a facet structure is possible, which permits a more precise evaluation of the light distribution while taking the spatial structure into account. As a result, oncoming vehicles can be detected, for example. Naturally, light frequencies can be filtered here as well. Based on this wealth of information, there can be an automatic, or semi-automatic switching, for example between high beams and low beams.

What is claimed is:

1. A sensor arrangement for detecting a wetting, of a precipitation and/or direct accumulation on a window (13), of motor vehicles, comprising at least one transmitter (14), at least one receiver (15), and at least one optical body (10) between the window (13) and the at least one transmitter (14) and the at least one receiver (15) for a radiation emitted by the at least one transmitter (14), wherein the projections of the at least one transmitters (14) and the at least one receivers (15), by being projected onto the window (13), constitute the vertex points of a trapezoid, wherein there are two each of the at least one transmitter (14) and the at least one receiver (15), and wherein the transmitters (14) are disposed on a first parallel of the trapezoid, wherein said first parallel is at the bottom in an installed position and the receivers (15) are disposed on a secod parallel of the trapezoid, wherein said second parallel is at the top of in the installed position.

2. The sensor arrangement according to claim 1, wherein between the at least one transmitters (14) and the at least one receiver (15), the radiation is reflected at least once against a surface of the window (13), where the at least one transmitter (14) emits radiation in different directions and the reflection surfaces thus produced form an at least approximately coherent sensitive area (19).

3. The sensor arrangement according to claim 1, wherein the at least one transmitter (14) emits radiation in two directions to two receivers (15).

4. The sensor arrangement according to claim 1, wherein the at least one receiver (15) receives radiation emitted by two transmitters (14), from two directions.

5. The sensor arrangement according to claim 1, wherein the trapezoid is a symmetrical trapezoid, where the distances of the two transmitters (14) differ from the distances of the two receivers (15) so that the one distance is approximately twice the other distance.

6. The sensor arrangement according to claim 1, wherein the sensor arrangement has four measurement paths.

7. The sensor arrangement according to claim 1, wherein centers of the reflection surfaces of the radiation cones (20) of the at least one transmitter (14) in the window (13) are spaced apart from one another by an at least approximately uniform distance on a line disposed between the two parallels of the trapezoid.

8. The sensor arrangement according to claim 1, wherein the optical body (10), transmitters (14), and receivers (15) are embodied and disposed in such a way that only a single total reflection of the transmitter light (17) occurs in the window (13).

9. The sensor arrangement according to claim 1, wherein each transmitter (14) and each receiver (15) on the optical body (10) is associated with an optical element (16), wherein each optical element has several separate lenses.

10. The sensor arrangement according to claim 9, wherein the lenses transition into one another.

11. The sensor arrangement according to claim 1, wherein each transmitter (14) and each receiver (15) on the optical body (10) is associated with an optical element (16), wherein each optical element has a single lens.

12. The sensor arrangement according to claim 5, wherein one set of receiving optics (21) for an automatic light control (ALS) is disposed centrally in the optical body (10) or shifted slightly toward the a longer parallel.

13. A sensor arrangement for detecting a wetting of a precipitation and/or direct accumulation on a window (13) of motor vehicles, comprising at least one transmitter (14), at least one receiver (15), and at least one optical body (10) between the window (13) and the at least one transmitter (14) and the at least one receiver (15) for radiation emitted by the at least one transmitter (14), wherein the projections of the at least one transmitter(14) and the at least one receiver (15), by being projected onto the window (13), constitute the vertex points of a trapezoid, wherein the optical body (10), transmitters (14), and receivers (15) are embodied and disposed in such a way that only a single total reflection of the transmitter light (17) occurs in the window (13), and wherein one set of receiving optics (21) for an automatic light control (ALS) is shifted slightly toward a longer parallel.

14. The sensor arrangement according to claim 13, wherein the receiving optics (21) includes an element (23), wherein said element is formed such that it determines the total brightness in a surrounding environment of a vehicle without direction sensitivity, and wherein further elements (22) are provided, wherein said further elements determine the brightness ratio in front of the vehicle with a light facet structure.

\* \* \* \* \*